2,784,168
POLYAMIDE SOLUTIONS

Arthur B. Beindorff, Decatur, Ala., assignor to The Chemstrand Corporation, Decatur, Ala., a corporation of Delaware No Drawing. Application January 10, 1955, Serial No. 481,007

8 Claims. (Cl. 260—33.2)

This invention relates to compositions of matter, and more particularly, to new and useful compositions of matter comprising solutions of synthetic linear polyamides.

The synthetic linear polyamides with which this invention is concerned comprise the self-polymerization products of monoaminomonocarboxylic acids having at least five carbon atoms in the chain separating the amino and carboxyl groups and the self-polymerization products of cyclic amides containing more than six annular atoms in which an amido nitrogen atom is an integral part of the ring. These polyamides can be obtained by the methods given in U. S. Patent 2,241,322 and by other methods, for example, by self-polymerization of a monoaminomonocarboxylic acid, or by self-polymerization of a cyclic amide, it being understood that reference herein to the amino acids is intended to include the equivalent amide-forming derivatives of those acids. The preferred polyamides obtained from these reactants have an intrinsic viscosity of at least 0.4 and a unit length of at least seven, where "intrinsic viscosity" and "unit length" are defined as in U. S. Patents 2,130,948 and 2,071,253.

These polyamides contain structural units of the general formula:

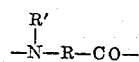

in which R' represents a hydrogen or a univalent hydrocarbon radical and R represents a divalent hydrocarbon radical having a chain of at least five carbon atoms, as an integral part of the main chain of atoms in the polymer. Upon hydrolysis with hydrochloric acid, these polyamides yield the amino acid hydrochloride. The synthetic linear polyamides for convenience will be referred to hereinafter simply as polyamides, or by the popular term nylon.

Although the polyamides as a class are microcrystalline and have fairly high and sharp melting points, they can be formed into many useful objects without the use of solvents as, for example, by spinning, extruding, or otherwise forming the object from the molten polyamide. There are certain advantages, however, in the use of solutions rather than molten compositions to achieve the fluid state necessary in lacquers, coating compositions and dopes suitable for use in forming objects such as films, fibers, sheets, ribbons, bristles, and filaments. For example, in coating fabrics, paper, or other materials which are charred or tendered by high temperatures, the use of a solution which can be applied and subsequently evaporated to dryness at a relatively low temperature does not cause deterioration of the material being coated. It is often desirable to prepare a fluid composition for use over a period of time and in that event it is convenient if the composiiton can be kept in the liquid state by storage at ordinary temperatures. The application of such solutions as lacquers and adhesives is much more easily carried out by methods well-known to the art than the application of molten composition. Further, the incorporation of plasticizers or other modifying agents in the polyamides can frequently be accomplished more advantageously by addition of the plasticizer to a solution of the polyamide rather than to the molten polyamide, thus minimizing the tendency toward discoloration and decomposition which frequently occurs when blending is done in a melt. Again, there is a tendency with certain types of plasticizers and modifying agents to be less compatible at the high temperatures required for blending in a melt, whereas they can be readily incorporated in the polyamide solution at a low temperature. A still further advantage in the use of solutions lies in the ease with which they can be cast into films or coatings of uniform thickness, which is mechanically more difficult to accomplish with a molten composition due to its relatively high viscosity.

Another important utilization of solutions of polyamides lies in the recovery of waste and scrap material from several sources, e. g., rejects during manufacture, turnings from the machining of solid nylon shapes, skeleton scrap resulting when parts are stamped from nylon strips, trimmings from the cutting of nylon fabric, and used nylon cloth and articles. If this scrap or waste is absolutely clean, it can be remelted under controlled conditions and used over again, but often such material is contaminated with foreign materials such as dirt, oil, grease, or floor sweepings, or it may contain unwanted impurities such as cotton thread, delustrants, etc.

Many solvents for polyamides are well-known to the prior art, but most are not practical for one reason or another. The polyamides as a class characteristically require corrosive media such as strong concentrated acids, phenols, cresols, and the like, as solvents, where solutions of the polyamides having useful degrees of concentration are needed. Even in the case of some of the more soluble types, which have been found to be soluble in higher alcohols at elevated temperatures or in heated mixtures or lower alcohols with other liquids such as chlorinated hydrocarbons or water, instability of solution and gelation on cooling having occasioned considerable difficulty. Furthermore, and particularly when strong acids are used as solvents, degradation of the polyamide constitutes a serious obstacle, especially at high temperatures and concentrations, and even when phenolic solvents are employed.

The primary object of this invention is the provision of new and useful compositions of matter comprising synthetic linear polyamide solutions which are useful in making threads, bristles, ribbons, coatings, and the like. Still another object is the preparation of polyamide solutions in relatively non-hazardous, non-corrosive, non-degrading, and inexpensive solvents.

These and other objects of the invention may be accomplished by dissolving a synthetic linear polyamide normally soluble in phenol and containing as an integral part of the main polymer chain, recurring units of the general formula:

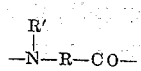

in which R' represents hydrogen or a univalent hydrocarbon radical and R represents a divalent hydrocarbon radical having a chain of at least five carbon atoms, in molten 2,2,2-trichloro-1-ethoxyethanol.

The temperature to which it is necessary to heat a mixture of the polyamide and 2,2,2-trichloro-1-ethoxyethanol in order to effect solution will, of course, depend both upon the melting point of the solvent and on the composition of the polyamide employed. Since 2,2,2-trichloro-1-ethoxyethanol is a solid at room temperature, it is necessary to heat it above its melting point before its solvent action for the polyamides is apparent. Any temperature above which the 2,2,2-trichloro-1-ethoxyethanol is molten and below its boiling point will be found suitable for solution of any of the polyamides described above. Solution can be effected more rapidly at high temperatures than at those nearer its melting point. In general, I have found it preferable when employing molten 2,2,2-trichloro-1-ethoxyethanol as a solvent to dissolve the polyamides at temperatures ranging up from about 60° to about 120° C.

While each polymer will vary somewhat in its solubility characteristics and temperature of solvation, this invention is applicable to all the simple linear polyamides described above. Polyamides useful in this invention are of two types, those derived from polymerizable monoaminomonocarboxylic acids and their amide-forming derivatives, and those derived from monomeric cyclic amides containing more than six annular atoms containing amido nitrogen as an integral part of the ring.

This invention is concerned with polyamides formed by the self-polymerization of monoaminomonocarboxylic acids having at least five carbon atoms in the chain separating the amino and carboxyl groups and the amide-forming derivatives thereof, such as 6-aminocaproic acid, ethyl-6-aminocaproate, 8-aminocaprylic acid, 9-aminononanoic acid, ethyl-9-aminononanoate, 11-aminoundecanoic acid, and 17-aminoheptadecanoic acid, and by the self-polymerization of monomeric cyclic amides containing more than six annular atoms in which the nitrogen is amido nitrogen and is an integral part of the ring, such as cyclohexanone isoxime (ε-caprolactam), the methylcyclohexanone isoximes, cycloheptanone isoxime, cyclooctanone isoxime, cyclopentadecanone isoxime, and cyclohexadecanone isoxime. These polyamides all dissolve in phenol but not in most simple alcohols. They do dissolve in 2,2,2-trichloro-1-ethoxyethanol in accordance with the present invention.

As pointed out above, the higher molecular weight polyamides, e. g., those having an intrinsic viscosity of about 0.4 and a unit length of at least 7, "intrinsic viscosity" and "unit length" being defined as in U. S. Patents 2,130,948 and 2,071,253, possess the inherent capability of being formed into filaments which can be cold-drawn into fibers showing orientation along the fiber axis by characteristic X-ray patterns. These high molecular weight varieties of the polyamides, though generally somewhat less soluble than the lower molecular weight varieties, are more useful for most purposes, since they excel in toughness and durability. The invention is described more specifically in the following examples in which the parts are by weight.

*Example I*

There was melted by gentle heating nine parts of 2,2,2-trichloro-1-ethoxyethanol and heating was continued to approximately 90° C. There was then added thereto one part of polycaprolactam. At this temperature, solution of the polymer was complete in less than five minutes and the solution became clear. This solution was applied as a thin coating to a glass surface. The coating was smooth, hard, and highly resistant to moisture.

*Example II*

There was melted by gentle heating seven parts of 2,2,2-trichloro-1-ethoxyethanol and the heating was continued to approximately 100° C. There was then added thereto one part of polycaprolactam. Solution of the polymer was complete at this temperature in approximately five minutes. This solution was suitable for extruding into non-solvent liquids for the polymer to form fibers.

In the foregoing examples, the invention has been illustrated with particular reference to solutions of polycaprolactam, but it is to be understood that the invention is not limited to this particular polyamide but rather to the synthetic linear polyamides as a class. Any of the polyamides described above in this specification can be substituted for the polycaprolactam with only minor changes in proportions and temperatures being required.

While these solutions are generally prepared by heating on a bath, other suitable means may be used. Stirring of the mixture during the heating process is advantageous but is not always necessary.

The properties of the objects formed from the compositions herein described may be modified by appropriate modification of the compositions. Thus, the compositions of this invention may have incorporated therein various modifying agents, such as plasticizers, dyes, pigments, diluents, resins, cellulose derivatives, waxes, water repellants, luster modifying agents, flame repellants, and the like. Solutions of different polyamides, or of a polyamide with other polymers or solutes can be solution blended and precipitated to give homogeneous blends, where melt blending is undesirable or impractical.

Fibers and filaments can be prepared by either dry-spinning or wet-spinning into suitable coagulating baths. Filaments obtained by these methods have a rougher surface and a more porous structure than those obtained by melt spinning. Staple fibers made by cutting these filaments, therefore, can be spun into yarns more readily than staple fibers made from melt spun filaments.

Although specific reference has been made to the use of solutions for the formation of films and fibers, the invention is not restricted thereto, since the solutions are useful for forming a variety of objects irrespective of the shape of the object. Typical objects which can be formed from the solution are bristles, surgical sutures, fishing leaders, fish lines, dental floss, ribbons, sheets, safety glass interlayers, golf ball covers, and plasticized or otherwise modified solid compositions useful for making molded articles. The solutions are also useful for application as lacquers on wood, metal, glass and other surfaces, for coating wire, fabrics, paper, regenerated cellulose and the like, and for impregnating fabric, paper, and other porous materials.

As many apparently widely different embodiments of this invention may be made without departing from the spirit and scope thereof, it is to be understood that the invention is not limited to the specific embodiments thereof except as defined in the appended claims.

I claim:

1. A composition of matter comprising a solution of a filament-forming synthetic linear polyamide normally soluble in phenol containing, as an integral part of the main polymer chain, recurring structural units of the general formula:

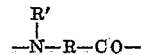

wherein R' is selected from the group consisting of hydrogen and a univalent hydrocarbon radical and R is a divalent hydrocarbon radical having a chain of at least five carbon atoms, in molten 2,2,2-trichloro-1-ethoxyethanol.

2. A composition of matter comprising a solution of a filament-forming synthetic linear polyamide in molten 2,2,2-trichloro-1-ethoxyethanol, said linear polyamide comprising the self-polymerization product of a material selected from the group consisting of monoaminomonocarboxylic acids having at least five carbon atoms in the chain separating the amino and carboxyl groups and monomeric cyclic amides containing more than six annular atoms in which the nitrogen is amido nitrogen and is an integral part of the ring.

3. A composition of matter comprising a solution of a filament-forming synthetic linear polyamide in molten 2,2,2-trichloro-1-ethoxyethanol, said linear polyamide being one which is normally soluble in phenol and being one which on hydrolysis with hydrochloric acid yields the hydrochloride of a monoamino-monocarboxylic acid having at least 5 carbon atoms in the chain separating the amino and carboxyl groups.

4. A composition of matter comprising a solution of polycaprolactam in molten 2,2,2-trichloro-1-ethoxyethanol.

5. A composition of matter comprising a solution of polymerized 8-aminocaprylic acid in molten 2,2,2-trichloro-1-ethoxyethanol.

6. A composition of matter comprising a solution of polymerized methyl cyclohexanone isoxime in molten 2,2,2-trichloro-1-ethoxyethanol.

7. A composition of matter comprising a solution of polymerized cycloheptanone isoxime in molten 2,2,2-trichloro-1-ethoxyethanol.

8. A composition of matter comprising a solution of polymerized cyclooctanone isoxime in molten 2,2,2-trichloro-1-ethoxyethanol.

References Cited in the file of this patent

UNITED STATES PATENTS 2,130,948   Carothers _____ Sept. 20, 1938